(No Model.) 2 Sheets—Sheet 1.

C. MADSEN.
BRIDGE GATE.

No. 453,244. Patented June 2, 1891.

Witnesses
Inventor
Christian Madsen (No Model.) 2 Sheets—Sheet 2.
C. MADSEN.
BRIDGE GATE.
No. 453,244. Patented June 2, 1891.
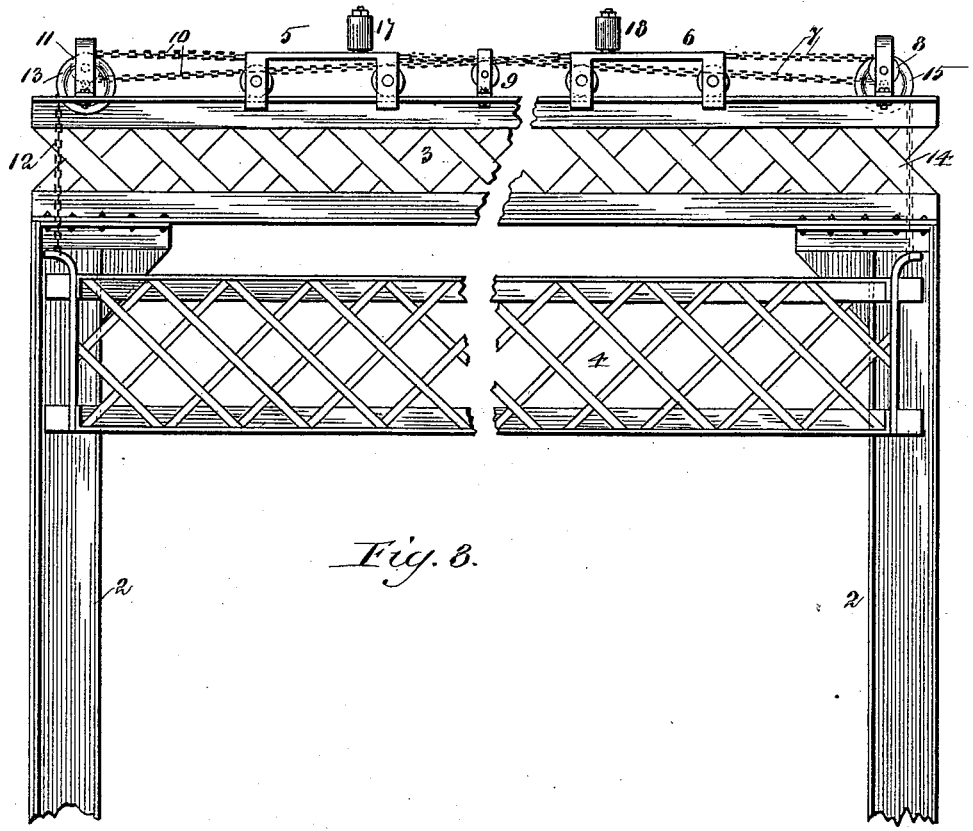
Fig. 3.
Fig. 4.
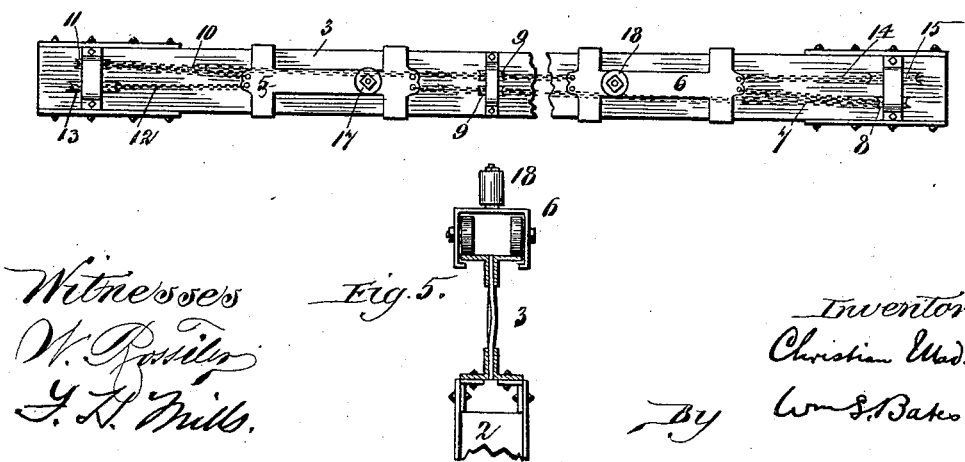
Fig. 5.
Witnesses
W. Russell
F. L. Mills
Inventor
Christian Madsen
By Wm. S. Baker
Atty

UNITED STATES PATENT OFFICE.

CHRISTIAN MADSEN, OF CHICAGO, ILLINOIS.

BRIDGE-GATE.

SPECIFICATION forming part of Letters Patent No. 453,244, dated June 2, 1891.

Application filed February 5, 1891. Serial No. 380,283. (No model.)

*To all whom it may concern:*

Be it known that I, CHRISTIAN MADSEN, of Chicago, Illinois, have invented certain new and useful Improvements in Bridge-Gates, of which the following is a specification.

My invention herein is an improvement upon that for which Letters Patent No. 433,206 were granted me July 29, 1890. In my said patent it was necessary always to swing the bridge the same way around. My present improvement is intended to obviate this necessity and make it possible to swing the bridge either way.

Figure 1:
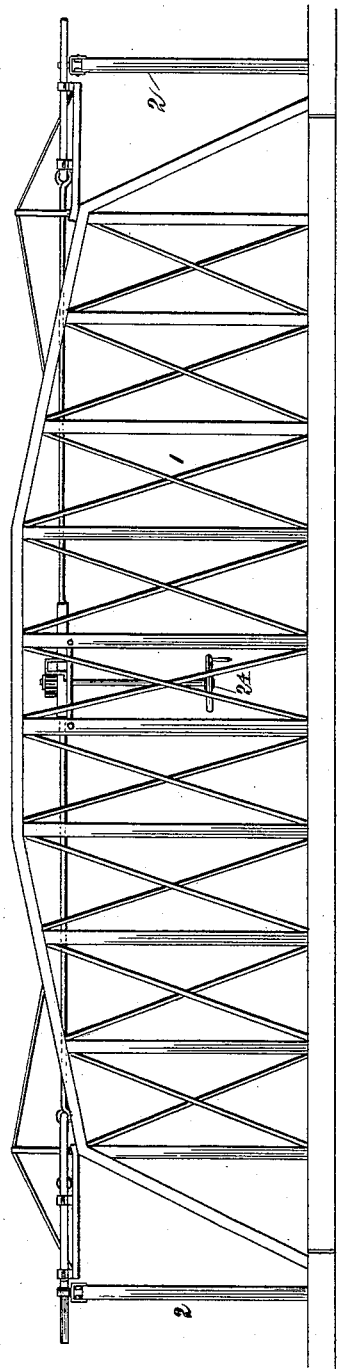
Figure 2:
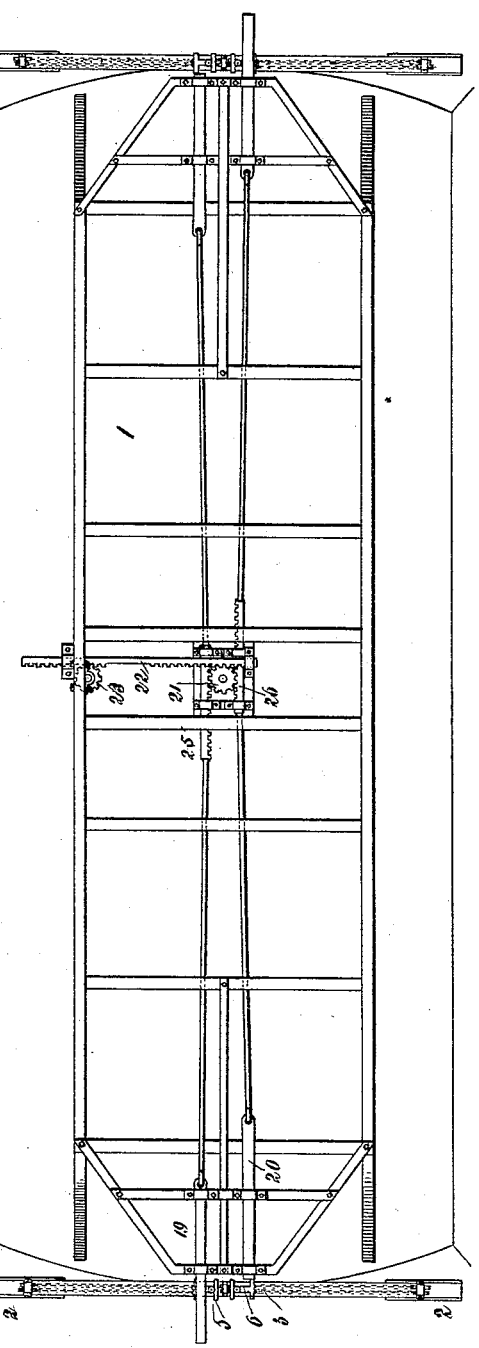

In the accompanying drawings, Figure 1 is an elevation of a bridge and gates. Fig. 2 is a top view of same. Fig. 3 is an end view showing the gate and its operating mechanism on a larger scale. Fig. 4 is a top view of same, and Fig. 5 a cross-section showing the trolley-track and trolley.

1 is the bridge, which is adapted to swing upon its turn-table in the usual manner.

2 are guide-posts on the approaches, one at each side of the roadway, connected at the tops by a cross-beam or truss 3.

4 is a gate adapted to move up and down in suitable ways in the guide-posts.

5 6 are trolleys moving on a track on the top of cross-beam 3.

7 is a chain connecting the outer end of trolley 6 with the inner end of trolley 5 and passing over pulley 8 and idler 9. 10 is a chain similarly connecting the outer end of trolley 5 with the inner end of trolley 6 and passing over pulley 11.

12 is a chain passing over pulley 13 and connecting the outer end of trolley 5 with the adjacent end of gate 4.

14 is a chain passing over pulley 15 and connecting the adjacent end of gate 4 with the outer end of trolley 6. Thus when either trolley is forced toward the middle of the beam 3 it draws the other trolley toward the same point by means of the chains 7 and 10 and raises the gate 4. When the gate descends, it draws both trolleys to their outer positions.

17 is a stud projecting upwardly from trolley 5.

18 is a similar stud on trolley 6. Both studs may be provided with friction-rollers, as shown.

19 is an arm movable in guides at the top of the bridge, so that it can be projected to engage the stud on trolley 5 and retracted so as to pass said stud. 20 is a similar arm similarly arranged with reference to the stud on trolley 6.

25 and 26 are racks near the middle of the bridge and connected by rods to arms 19 and 20, respectively.

21 is a pinion between the racks 25 and 26 and meshing with both of them. By rotating pinion 21 one of the arms 19 20 is projected and the other retracted.

A convenient means for operating pinion 21 consists of rack 22, pinion 23, and hand-wheel 24 on the shaft of pinion 23, though in double-track bridges the hand-wheel may be on the shaft of pinion 21.

I claim—

1. The combination, substantially as set forth, with the vertically-moving gate and the swinging bridge, of a trolley connected to each end of the gate, a connection between said trolleys to cause their simultaneous movement toward each other, and two arms on the bridge adapted to be alternately projected and retracted to engage or pass said trolleys.

2. The combination, substantially as set forth, with the vertically-moving gate and the swinging bridge, of the trolleys connected to the ends of the gate, the chains connecting said trolleys so that a movement of one involves a simultaneous and opposite movement of the other, the arms, as 19 and 20, on the bridge, and the racks and pinion to operate said arms.

CHRISTIAN MADSEN.

Witnesses:
 W. S. BATES,
 E. P. PIHL.